(12) United States Patent
Sun et al.

(10) Patent No.: US 10,732,763 B2
(45) Date of Patent: Aug. 4, 2020

(54) TOUCH CONTROL PANEL, DISPLAY APPARATUS, AND PRODUCTION METHOD OF TOUCH CONTROL PANEL

(71) Applicants: BOE Technology Group Co., Ltd., Beijing (CN); Ordos Yuansheng Optoelectronics Co., Ltd., Inner Mongolia (CN)

(72) Inventors: Shicheng Sun, Beijing (CN); Yezhou Fang, Beijing (CN); Peirong Huo, Beijing (CN); Shuang Hu, Beijing (CN); Pei Wang, Beijing (CN)

(73) Assignees: BOE TECHNOLOGY GROUP CO., LTD., Beijing (CN); ORDOS EQUIPMENT MANUFACTURING BASE, Ordos, Inner Mongolia (CN)

( * ) Notice: Subject to any disclaimer, the term of this patent is extended or adjusted under 35 U.S.C. 154(b) by 244 days.

(21) Appl. No.: 16/068,381

(22) PCT Filed: Sep. 22, 2017

(86) PCT No.: PCT/CN2017/102944
§ 371 (c)(1),
(2) Date: Jul. 6, 2018

(87) PCT Pub. No.: WO2018/196272
PCT Pub. Date: Nov. 1, 2018

(65) Prior Publication Data
US 2020/0174613 A1      Jun. 4, 2020

(30) Foreign Application Priority Data

Apr. 26, 2017   (CN) .......................... 2017 1 0282070

(51) Int. Cl.
*G06F 3/041*     (2006.01)
*G02F 1/1335*    (2006.01)
*G02F 1/1333*    (2006.01)

(52) U.S. Cl.
CPC ........ *G06F 3/0416* (2013.01); *G02F 1/13338* (2013.01); *G02F 1/133514* (2013.01);
(Continued)

(58) Field of Classification Search
CPC ................ G06F 3/0416; G06F 3/0412; G06F 2203/04103; G02F 1/13338; G02F 1/133514; G02F 1/133528
See application file for complete search history.

(56) References Cited

U.S. PATENT DOCUMENTS

| 10,302,996 B2 | 5/2019 | Li et al. |
| 2016/0246417 A1 | 8/2016 | Liu et al. |

(Continued)

FOREIGN PATENT DOCUMENTS

| CN | 103167791 A | 6/2013 |
| CN | 103200808 A | 7/2013 |

(Continued)

OTHER PUBLICATIONS

International Search Report and Written Opinion, including English translation of Box V, for International Application No. PCT/CN2017/102944, dated Jan. 31, 2018, 14 pages.
(Continued)

*Primary Examiner* — Abbas I Abdulselam
(74) *Attorney, Agent, or Firm* — Westman, Champlin & Koehler, P.A.

(57) ABSTRACT

A touch control panel, a display apparatus, and a production method of a touch control panel are provided, which relates to the technical field of display. Specifically, there provides a touch control panel, comprising: an array substrate; a color filter substrate which is cell-aligned with the array substrate; and a polarizer located on the color filter substrate, wherein a high-impedance optical adhesive is provided above the polarizer, a ground point is provided on a surface of the array
(Continued)

substrate towards the color filter substrate, and a conductive adhesive foam is attached on the ground point and is connected to the high-impedance optical adhesive.

18 Claims, 3 Drawing Sheets

(52) U.S. Cl.
CPC ...... *G02F 1/133528* (2013.01); *G06F 3/0412* (2013.01); *G06F 2203/04103* (2013.01)

(56) References Cited

U.S. PATENT DOCUMENTS

2016/0364071 A1* 12/2016 Chiang ................. G06F 3/0416
2018/0046024 A1 2/2018 Li et al.
2018/0080628 A1 3/2018 Feng et al.

FOREIGN PATENT DOCUMENTS

| | | |
|---|---|---|
| CN | 104090677 A | 10/2014 |
| CN | 105183212 A | 12/2015 |
| CN | 105467646 A | 4/2016 |
| CN | 105573557 A | 5/2016 |
| CN | 105786244 A | 7/2016 |
| CN | 205539836 U | 8/2016 |
| CN | 205665677 U | 10/2016 |
| CN | 107102461 A | 8/2017 |
| KR | 20110108528 A | 10/2011 |

OTHER PUBLICATIONS

Office Action, including Search Report, for Chinese Patent Application No. 201710282070.4, dated Oct. 18, 2019, 13 pages.

* cited by examiner

TOUCH CONTROL PANEL, DISPLAY APPARATUS, AND PRODUCTION METHOD OF TOUCH CONTROL PANEL

CROSS-REFERENCE TO RELATED APPLICATION

This application is a Section 371 National Stage Application of International Application No. PCT/CN2017/102944, filed on Sep. 22, 2017, entitled "TOUCH CONTROL PANEL, DISPLAY APPARATUS, AND PRODUCTION METHOD OF TOUCH CONTROL PANEL", which has not yet published, which claims priority benefits from Chinese Application No. 201710282070.4 filed on Apr. 26, 2017, the entire contents of which are hereby incorporated by reference.

TECHNICAL FIELD

This disclosure relates to the technical field of display, and particularly to a touch control panel, a display apparatus, and a production method of a touch control panel.

BACKGROUND

With the continuous development of display techniques, the touch control panels for touch control input have been widely used in televisions, cell phones, portable terminals, and other display apparatuses. Among these, a full-in-cell (FIC) touch control panel in which a touch control electrode is embedded in a touch control panel may allow a touch control panel to be lighter and thinner. Therefore, the large manufacturers have paid much attention on full-in-cell touch control panels.

At present, with respect to a full-in-cell touch control panel, a touch control electrode is provided in a liquid crystal cell formed by cell-aligning an array substrate and a color filter substrate. In order to prevent external static electricity, with respect to an on-cell touch control panel, a conductive layer is plated on the top surface of a color filter substrate. This conductive layer is typically produced from an ITO (Indium tin oxide) material. This conductive layer is connected to a silver paste dot on the array substrate and the silver paste dot is connected to a ground terminal, so that external static electricity is released.

SUMMARY

This disclosure provides a touch control panel, a display apparatus, and a production method of a touch control panel.

Specifically, this disclosure discloses a touch control panel, comprising:
an array substrate;
a color filter substrate which is cell-aligned with the array substrate; and
a polarizer located on the color filter substrate,
wherein a high-impedance optical adhesive is provided above the polarizer, a ground point is provided on a surface of the array substrate towards the color filter substrate, and a conductive adhesive foam is attached on the ground point and is connected to the high-impedance optical adhesive.

Optionally, a part of the conductive adhesive foam is attached to an area of the color filter substrate which is not covered by the polarizer; and the high-impedance optical adhesive at least partly covers the part of the conductive adhesive foam located on the area of the color filter substrate which is not covered by the polarizer.

Optionally, the ground point is connected to a ground terminal of the array substrate, and the ground terminal of the array substrate is connected to a ground terminal of a flexible printed circuit corresponding to the touch control panel.

Optionally, the conductive adhesive foam comprises a foam strip and a conductive part; and the conductive part comprises a conductive cloth and a conductive adhesive strip, or comprises a conductive paper and a conductive adhesive strip.

Optionally, the conductive part has a thickness which is the same as that of the polarizer.

Optionally, a material of the conductive adhesive strip comprises a silicone rubber.

Optionally, the high-impedance optical adhesive has an impedance of $1E+8\Omega$ to $1E+10\Omega$.

Optionally, the touch control panel further comprises a cover plate, which is bonded with the high-impedance optical adhesive.

Optionally, the array substrate is a low-temperature polycrystalline silicon array substrate.

Optionally, the touch control panel comprises a full-in-cell touch control panel.

This disclosure further discloses a display apparatus, comprising the touch control panel described above.

This disclosure further discloses a production method of a touch control panel comprising an array substrate, a color filter substrate which is cell-aligned with the array substrate, and a polarizer located on the color filter substrate, wherein a high-impedance optical adhesive is provided above the polarizer, a ground point is provided on a surface of the array substrate towards the color filter substrate, and a conductive adhesive foam is attached on the ground point and is connected to the high-impedance optical adhesive, the method comprising steps of:

attaching the conductive adhesive foam onto the ground point on the surface of the array substrate towards the color filter substrate, and attaching the conductive adhesive foam to a position to be connected to the high-impedance optical adhesive; and laminating a cover plate and a high-impedance optical adhesive, which are bonded, on the polarizer.

Optionally, a part of the conductive adhesive foam is attached to an area of the color filter substrate which is not covered by the polarizer; and the high-impedance optical adhesive at least partly covers the part of the conductive adhesive foam located on the area of the color filter substrate which is not covered by the polarizer.

Optionally, the ground point is connected to a ground terminal of the array substrate, and the ground terminal of the array substrate is connected to a ground terminal of a flexible printed circuit corresponding to the touch control panel.

Optionally, the conductive adhesive foam comprises a foam strip and a conductive part; and the conductive part comprises a conductive cloth and a conductive adhesive strip, or comprises a conductive paper and a conductive adhesive strip.

Optionally, the conductive part has a thickness which is the same as that of the polarizer.

Optionally, a material of the conductive adhesive strip comprises a silicone rubber.

Optionally, wherein the high-impedance optical adhesive has an impedance of $1E+8\Omega$ to $1E+10\Omega$.

Optionally, the array substrate is a low-temperature polycrystalline silicon array substrate.

Optionally, the touch control panel comprises a full-in-cell touch control panel.

The above description is merely an summary of the technical solutions of this disclosure. In order to be able to understand technical means of this disclosure more clearly, implementations may be made according to the contents of the specification. Furthermore, in order to enable above and other objects, features, and advantages of this disclosure to be more remarkably and easily understood, specific embodiments of this disclosure are particularly exemplified below.

BRIEF DESCRIPTION OF THE DRAWINGS

Various other advantages and benefits will become clear and apparent to those of ordinary skill in the art by reading the detailed description of preferred embodiments hereinafter. The accompanying drawings are only for the purpose of illustrating the preferred embodiments, and should not be considered as limitations to this invention. In all of the accompanying drawings, the same reference numeral represents the same member. In the drawing.

DESCRIPTION OF EMBODIMENTS

Exemplary Examples of this disclosure will be described in further detail below with reference to accompanying drawings. Although exemplary Examples of this disclosure are shown in the accompanying drawings, it is to be understood that this disclosure may be achieved in various forms and should not be limited by the Examples elaborated herein. On the contrary, these Examples are provided to understand this disclosure more thoroughly and to be capable of fully conveying the scope of this disclosure to the person skilled in the art.

The inventor has found that if a method using a conductive layer and a silver paste dot is used to prevent the damage to a full-in-cell touch control panel by external static electricity, a shielding layer will be formed when a touch control signal is generated and thus the touch control signal is shielded since a touch control electrode of the full-in-cell touch control panel is located in a liquid crystal cell formed by cell-aligning an array substrate and a color filter substrate and a conductive layer is connected to a ground terminal, so that there is no capacitance produced between a finger and the touch control electrode and the function of touch control of the full-in-cell touch control panel fails. Therefore, static electricity cannot be conducted by a method using a conductive layer and a silver paste dot. When static electricity is directly applied onto a full-in-cell touch control panel, the full-in-cell touch control panel will be easily damaged, so that the antistatic capability of the full-in-cell touch control panel is impacted.

An example of the disclosure discloses a touch control panel, comprising:

an array substrate;

a color filter substrate which is cell-aligned with the array substrate; and a polarizer located on the color filter substrate, wherein a high-impedance optical adhesive is provided above the polarizer, a ground point is provided on a surface of the array substrate towards the color filter substrate, and a conductive adhesive foam is attached on the ground point and is connected to the high-impedance optical adhesive.

Figure 1:
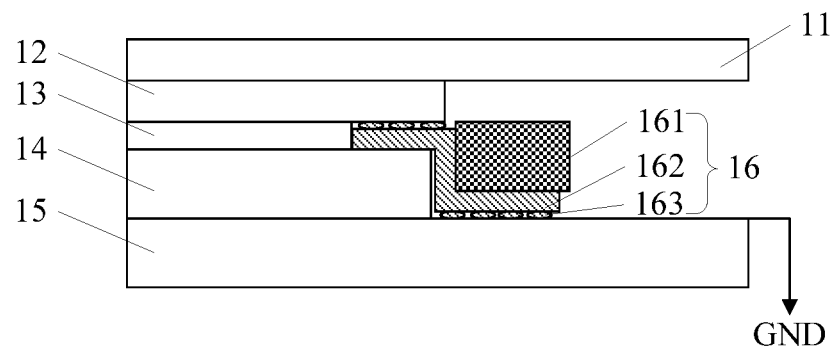
FIG. 1 shows a structural schematic diagram of a touch control panel in an Example of this disclosure.

With reference to FIG. 1, there is shown a structural schematic diagram of a touch control panel in an Example of this disclosure.

In Examples of this disclosure, a touch control panel comprises an array substrate 15, a color filter substrate 14 which is cell-aligned with the array substrate 15, and a polarizer 13 located on the color filter substrate 14, wherein a high-impedance optical adhesive 12 is provided above the polarizer 13, a ground point is provided on a surface of the array substrate 15 towards the color filter substrate 14, and a conductive adhesive foam 16 is attached on the ground point and is connected to the high-impedance optical adhesive 12.

Here, the ground point may be provided at the position of an original silver paste dot. The ground point is connected to a ground terminal of the array substrate 15, such as GND (ground terminal) shown in FIG. 1, and the ground terminal of the array substrate 15 is connected to a ground terminal of a flexible printed circuit corresponding to the touch control panel. The touch control panel may further comprise a cover plate 11, and the cover plate 11 is bonded with the high-impedance optical adhesive 12 to improve the sealability of the touch control panel.

In Examples of this disclosure, by connecting a high-impedance optical adhesive 12, a conductive adhesive foam 16, and a ground point, static electricity generated outside the touch control panel is conducted onto the conductive adhesive foam 16 via the high-impedance optical adhesive 12, then conducted onto the ground point of the array substrate 15 via the conductive adhesive foam 16, next conducted to the ground terminal of the array substrate 15, and grounded through the ground terminal of the flexible printed circuit to form a static electricity conduction pathway. Internal structures of the touch control panel are protected, the damage to the touch control panel by static electricity is prevented, and the antistatic capability of the touch control panel is improved.

In a preferred Example among Examples of this disclosure, a part of the conductive adhesive foam 16 is attached to an area of the color filter substrate 14 which is not covered by the polarizer 13, and the high-impedance optical adhesive 12 at least partly covers the part of the conductive adhesive foam 16 located in the area of the color filter substrate 14 which is not covered by the polarizer 13. By partial contact between the high-impedance optical adhesive and the conductive adhesive foam, the conduction capability of static electricity may be improved.

Here, the optical adhesive may also be described as OCA (Optically Clear Adhesive). The high-impedance optical adhesive has an impedance of $1E+8\Omega$ to $1E+10\Omega$. By adding the high-impedance optical adhesive in the touch control panel, there is a certain effect of conduction on static electricity and the antistatic capability of the touch control panel is improved, while a normal touch control function of the touch control panel is ensured.

The conductive adhesive foam comprises a foam strip and a conductive part; and the conductive part comprises a conductive cloth and a conductive adhesive strip, or comprises a conductive paper and a conductive adhesive strip. The conductive part has a thickness which is the same as that of the polarizer 13 to prevent the protrusion of the conductive part and resultant bonding bubbles.

As shown in FIG. 1, the conductive adhesive foam comprises a foam strip 161 and a conductive adhesive strip 163, and 162 may be a conductive cloth or may be a conductive paper. Description in which 162 is a conductive cloth is made. A conductive adhesive strip is stuck to the lower surface of the conductive cloth 162 and the conductive adhesive strip present in a part of region of the lower surface is connected to the ground point, and a conductive adhesive strip is further stuck to the upper surface of the conductive cloth 162 and the conductive adhesive strip present in the upper surface is connected to the high-impedance optical adhesive 12.

The material of the conductive adhesive strip comprises a silicone rubber. The silicone rubber comprises any one of fine conductive particles selected from silver plated aluminum, silver plated glass fiber, silver plated copper, silver, nickel plated graphite, silver plated nickel, low-density silver, high-density silver, pure nickel, and carbon black. A good conductive property is achieved by uniformly distributing any one of fine conductive particles selected from silver plated aluminum, silver plated glass fiber, silver plated copper, silver, nickel plated graphite, silver plated nickel, low-density silver, high-density silver, pure nickel, and carbon black in the silicone rubber, and contacting the fine conductive particles by pressure. The conductive adhesive strip should have a good adhesion property so as to be stuck to a conductive cloth or a conductive paper. Since the silicone rubber has a good sealing property for water vapor, it not only maintains the original sealing property for water vapor but also has a high conductivity by adding conductive particles into the silicone rubber to form a filled-type conductive adhesive strip. At the meanwhile, it also has good capabilities of electromagnetic shielding and environment sealing.

Figure 2:
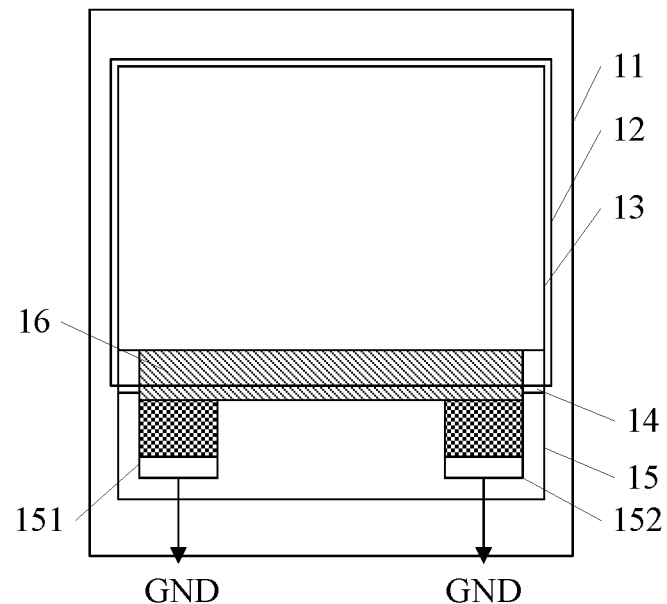
FIG. 2 shows a plan view of a touch control panel in an Example of this disclosure.

With reference to FIG. 2, there is shown a plan view of a touch control panel in an Example of this disclosure.

As shown in FIG. 2, 11 is a cover plate, 12 is a high-impedance optical adhesive, 13 is a polarizer, 14 is a color filter substrate, 15 is an array substrate, 16 is a conductive adhesive foam, 151 and 152 are ground points on the array substrate 15. The ground point may be provided at the position of an original silver paste dot. The ground point is connected to a ground terminal of the array substrate 15, such as GND shown in FIG. 2, and the ground terminal of the array substrate 15 is connected to a ground terminal of a flexible printed circuit corresponding to the touch control panel. Here, two ground terminals are on two sides of the array substrate, respectively.

In Examples of this disclosure, by connecting a high-impedance optical adhesive 12, a conductive adhesive foam 16, and a ground point, static electricity generated outside the touch control panel is conducted onto the conductive adhesive foam 16 via the high-impedance optical adhesive 12, then conducted onto the ground point of the array substrate 15 via the conductive adhesive foam 16, next conducted to the ground terminal of the array substrate 15, and grounded through the ground terminal of the flexible printed circuit to form a static electricity conduction pathway. Internal structures of the touch control panel are protected, the damage to the touch control panel by static electricity is prevented, and the antistatic capability of the touch control panel is improved.

Here, the array substrate is a low-temperature polycrystalline silicon array substrate, the touch control panel comprises a full-in-cell touch control panel, and this low-temperature polycrystalline silicon array substrate may also be described as an LTPS array substrate. Sine a touch control electrode is provided in a liquid crystal cell formed by cell-aligning an array substrate and a color filter substrate with respect to a full-in-cell touch control panel and a static electricity conduction pathway is formed by connecting a high-impedance optical clear adhesive, a conductive adhesive foam, and a ground point, a normal touch control function of a full-in-cell touch control panel is ensured and at the meanwhile the damage to the full-in-cell touch control panel by static electricity is prevented, and the antistatic capability of the full-in-cell touch control panel is improved. Additionally, the touch control panel may also comprise an on-cell touch control panel, the damage to the on-cell touch control panel by static electricity can also be prevented, and the antistatic capability of the on-cell touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted. The conductive adhesive foam may not only comprise a touch control panel but may also conduct static electricity, so that the foam has dual effects and the time and cost are effectively saved.

In Examples of this disclosure, a high-impedance optical adhesive is provided above a polarizer of a touch control panel, a ground point is provided on a surface of an array substrate of the touch control panel towards a color filter substrate, and a conductive adhesive foam is attached onto the ground point and is connected to the high-impedance optical adhesive. By connecting a high-impedance optical adhesive, a conductive adhesive foam, and a ground point, a static electricity conduction pathway is formed, the damage to the touch control panel by static electricity is prevented, and the antistatic capability of the touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted.

An Example of this disclosure further discloses a display apparatus, comprising the touch control panel described above. The touch control panel comprises an array substrate, a color filter substrate which is cell-aligned with the array substrate, and a polarizer located on the color filter substrate, wherein a high-impedance optical adhesive is provided above the polarizer, a ground point is provided on a surface of the array substrate towards the color filter substrate, and a conductive adhesive foam is attached on the ground point and is connected to the high-impedance optical adhesive.

In Examples of this disclosure, this display apparatus comprises a touch control panel. A high-impedance optical adhesive is provided above a polarizer of a touch control panel, a ground point is provided on a surface of an array substrate of the touch control panel towards a color filter substrate, and a conductive adhesive foam is attached onto the ground point and is connected to the high-impedance optical adhesive. By connecting a high-impedance optical adhesive, a conductive adhesive foam, and a ground point, an static electricity conduction pathway is formed, the damage to the touch control panel by static electricity is prevented, and the antistatic capability of the touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted.

Figure 3:
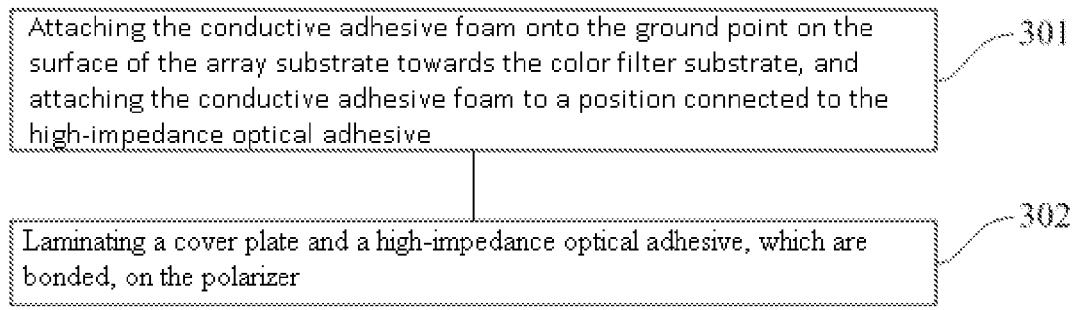
FIG. 3 shows a flow chart of a production method of a touch control panel in an Example of this disclosure.

With reference to FIG. 3, there is shown a flow chart of a production method of a touch control panel in an Example of this disclosure. It may specifically comprise the following steps.

Step 301, attaching the conductive adhesive foam onto the ground point on the surface of the array substrate towards the color filter substrate, and attaching the conductive adhesive foam to a position to be connected to the high-impedance optical adhesive.

In Examples of this disclosure, a part of a static electricity conduction pathway is formed by attaching a conductive adhesive foam onto a ground point on a surface of the array substrate towards the color filter substrate, and attaching the conductive adhesive foam to a position to be connected to the high-impedance optical adhesive.

Figure 4:
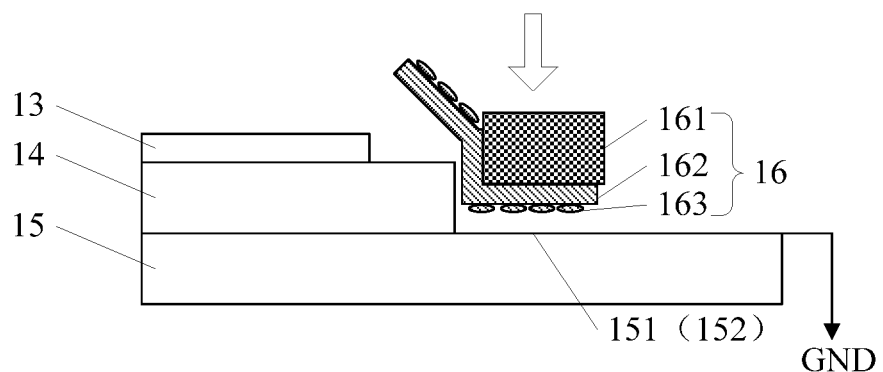
FIG. 4 shows a schematic diagram of the production of a touch control panel in an Example of this disclosure.

With reference to FIG. 4, there is shown a schematic diagram of the production of a touch control panel in an Example of this disclosure.

In Examples of this disclosure, a touch control panel comprises an array substrate 15, a color filter substrate 14 which is cell-aligned with the array substrate 15, and a polarizer 13 located on the color filter substrate 14. A conductive adhesive foam 16 is subjected to aligning attachment according to the direction of the arrow in FIG. 4. Conductive adhesive strips 163 present in a part of region of the lower surface of the conductive adhesive foam 16 correspond to the position of the ground point 151 or 152 on the array substrate 15 so that the attached conductive adhesive foam can conduct static electricity onto the ground point. The ground point may be provided at the position of an original silver paste dot. The ground point is connected to a ground terminal of the array substrate, such as GND shown in FIG. 4, and the ground terminal of the array substrate is connected to a ground terminal of a flexible printed circuit corresponding to the touch control panel. Here, the conductive adhesive foam comprises a foam strip 161 and a conductive part. The conductive part comprises a conductive cloth 162 and a conductive adhesive strip 163, or comprises a conductive paper 162 and a conductive adhesive strip 163. 162 may be a conductive cloth or may be a conductive paper.

Figure 5:
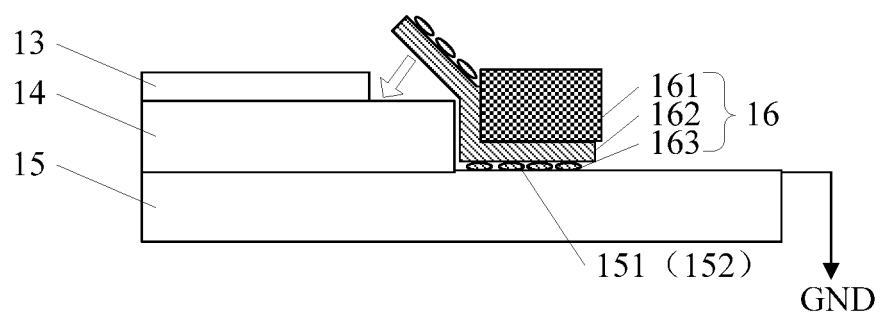
FIG. 5 shows a schematic diagram of the production of a touch control panel in an Example of this disclosure.

With reference to FIG. 5, there is shown a schematic diagram of the production of a touch control panel in an Example of this disclosure.

On the basis of FIG. 4, after conductive adhesive strips 163 present in in a part of region of the lower surface of the conductive adhesive foam 16 are attached to the positions of the ground point 151 or 152 on the array substrate 15, the remaining conductive part of the conductive adhesive foam 16 is pressed to be attached to an area of the color filter substrate 14 which is not covered by the polarizer 13 according to the direction of the arrow in FIG. 5 so as to be subsequently connected to the high-impedance optical adhesive. The conductive part of the conductive adhesive foam comprises a conductive cloth and a conductive adhesive strip, or comprises a conductive paper and a conductive adhesive strip. The conductive part has a thickness which is the same as that of the polarizer to prevent the protrusion of the conductive part and resultant bonding bubbles.

Figure 6:
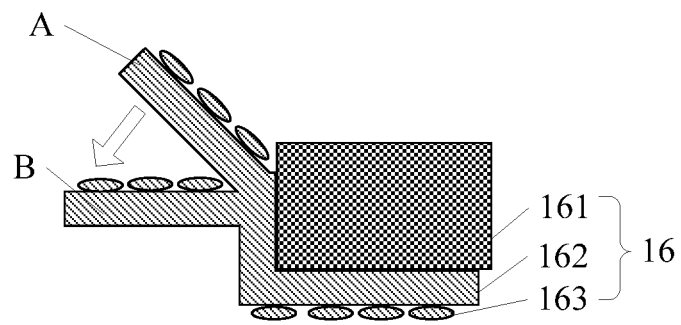
FIG. 6 shows a schematic diagram of the attachment of a conductive adhesive foam in an Example of this disclosure.

A schematic diagram of specific operation can be referred to those as shown in FIG. 6. FIG. 6 shows a schematic diagram of the attachment of a conductive adhesive foam in an Example of this disclosure.

In Examples of this disclosure, the remaining conductive part of the conductive adhesive foam 16 is folded and pressed from position A to position B according to the direction of the arrow in FIG. 6, and position B is an area of the color filter substrate which is not covered by the polarizer.

Step 302, laminating a cover plate and a high-impedance optical adhesive, which are bonded, on the polarizer.

In Examples of this disclosure, a cover plate is first bonded with a high-impedance optical adhesive, the cover plate and the high-impedance optical adhesive, which are bonded, are laminated on the polarizer, a laminated touch control panel is then placed in a pressurized chamber, and the bubbles generated in the process of lamination is pressed and removed via a high pressure to finally obtain a touch control panel.

Figure 7:
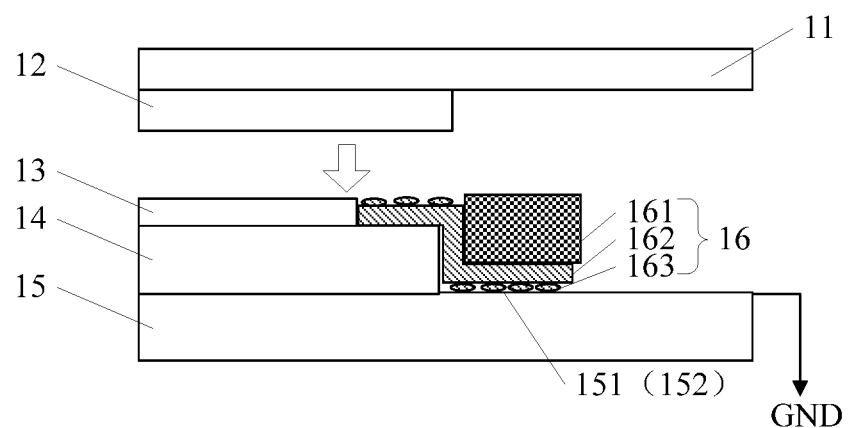
FIG. 7 shows a schematic diagram of the production of a touch control panel in an Example of this disclosure.

With reference to FIG. 7, there is shown a schematic diagram of the production of a touch control panel in an Example of this disclosure.

On the basis of FIG. 5, the cover plate 11 and the high-impedance optical adhesive 12, which are bonded, are aligned and laminated on the polarizer 13 according to the direction of the arrow in FIG. 7 to finally obtain the touch control panel as shown in FIG. 1.

Here, the high-impedance optical adhesive 12 at least partly covers the conductive adhesive foam 16 located in the area of the color filter substrate 14 which is not covered by the polarizer 13. By the partial contact between the high-impedance optical adhesive and the conductive adhesive foam, the conduction capability of static electricity may be improved. The high-impedance optical adhesive has an impedance of $1E+8\Omega$ to $1E+10\Omega$. By adding the high-impedance optical adhesive in the touch control panel, there is a certain effect of conduction on static electricity and the antistatic capability of the touch control panel is improved, while a normal touch control function of the touch control panel is ensured.

In Examples of this disclosure, by connecting a high-impedance optical adhesive 12, a conductive adhesive foam 16, and a ground point, static electricity generated outside the touch control panel is conducted onto the conductive adhesive foam 16 via the high-impedance optical adhesive 12, then conducted onto the ground point of the array substrate 15 via the conductive adhesive foam 16, next conducted to the ground terminal of the array substrate 15, and grounded through the ground terminal of the flexible printed circuit to form a static electricity conduction pathway. Internal structures of the touch control panel are protected, the damage to the touch control panel by static electricity is prevented, and the antistatic capability of the touch control panel is improved.

Here, the array substrate is a low-temperature polycrystalline silicon array substrate, and the touch control panel comprises a full-in-cell touch control panel. Sine a touch control electrode is provided in a liquid crystal cell formed by cell-aligning an array substrate and a color filter substrate with respect to a full-in-cell touch control panel and a static electricity conduction pathway is formed by connecting a high-impedance optical clear adhesive, a conductive adhesive foam, and a ground point, a normal touch control function of a full-in-cell touch control panel is ensured and at the meanwhile the damage to the full-in-cell touch control panel by static electricity is prevented, and the antistatic capability of the full-in-cell touch control panel is improved. Additionally, the touch control panel may also comprise an on-cell touch control panel, the damage to the on-cell touch control panel by static electricity can also be prevented, and the antistatic capability of the on-cell touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted. The conductive adhesive foam may not only comprise a touch control panel but may also conduct static electricity, so that the foam has dual effects and the time and cost are effectively saved.

In Examples of this disclosure, a conductive adhesive foam is attached onto a ground point on a surface of the array substrate towards the color filter substrate, and the conductive adhesive foam is attached to a position to be connected to the high-impedance optical adhesive, and a cover plate and a high-impedance optical adhesive, which are bonded, are laminated on the polarizer. By connecting a high-impedance optical adhesive, a conductive adhesive foam, and a ground point, an static electricity conduction pathway is formed, the damage to the touch control panel by static electricity is prevented, and the antistatic capability of the touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted.

Compared to the prior art, this disclosure includes the following advantages.

A high-impedance optical adhesive is provided above a polarizer of a touch control panel, a ground point is provided on a surface of an array substrate of the touch control panel towards a color filter substrate, and a conductive adhesive foam is attached onto the ground point and is connected to the high-impedance optical adhesive. By connecting a high-impedance optical adhesive, a conductive adhesive foam, and a ground point, a static electricity conduction pathway is formed, the damage to the touch control panel by static electricity is prevented, and the antistatic capability of the touch control panel is improved. By replacing an original silver paste by a conductive adhesive foam, the foreign matters resulting from silver paste debris in the process are reduced, the defect rate caused by bonded foreign matters is reduced, and the yield rate of the touch control panel is improved. The attachment process of the conductive adhesive foam is simple, only alignment is required, there is no difficulty in the process of coating, and modular automation may be effectively promoted.

Methods and Examples described above are expressed as combinations of a series of actions for the purpose of simple description. However, it is to be known by the person skilled in the art that this disclosure is not limited by the order of the actions described, because certain steps may be performed in another order or in parallel according to this disclosure. Next, it is also to be known by the person skilled in the art that Examples described in the specification all belong to the preferable Examples, and the actions and modules involved are not necessarily required by this disclosure.

Various Examples in this specification are all described in a progressive manner. Each of the Examples emphatically illustrates those different from other Examples, and the same or similar parts between Examples can be referred to each other.

Finally, it is to be further indicated that the relational terms such as first, second, and the like are merely to distinguish one entity or operation from another entity or operation, and it does not necessarily require or imply that there is any actual relation or order between these entities and operations. Additionally, the terms "include", "comprise", or any other variant, intends to cover nonexclusive inclusion, such that a process, method, merchandise, or device comprising a range of elements comprises not only those elements, but also other elements which are not specifically listed or elements intrinsically possessed by this process, method, merchandise, or device. In absence of more limitations, an element defined by a sentence "comprise a" does not exclude that there is additionally the same element in a process, method, merchandise, or device comprising this element.

A touch control panel, a display apparatus, and a production method of a touch control panel provided in this disclosure are introduced in detail above, particular examples are used herein to elaborate the principle and the embodiment of this disclosure. The description of the above Examples is only used to help the understanding of the method of this disclosure and the core idea thereof. At the meanwhile, with respect to those of ordinary skill in the art, modifications will be made to specific embodiments and application ranges according to the idea of this disclosure. In summary, the contents of this specification should not be construed to limit this invention.

What is claimed is:

1. A touch control panel, comprising: an array substrate; a color filter substrate, which is cell aligned with the array substrate; and a polarizer located on the color filter substrate, wherein a high-impedance optical adhesive is provided above the polarizer, a ground point is provided on a surface of the array substrate towards the color filter substrate, and a conductive adhesive foam is attached on the ground point and is connected to the high-impedance optical adhesive, wherein the ground point is connected to a ground terminal of the array substrate, and the ground terminal of the array substrate is connected to a ground terminal of a flexible printed circuit corresponding to the touch control panel.

2. The touch control panel according to claim 1, wherein a part of the conductive adhesive foam is attached to an area of the color filter substrate which is not covered by the polarizer; and the high-impedance optical adhesive at least partly covers the part of the conductive adhesive foam located on the area of the color filter substrate which is not covered by the polarizer.

3. The touch control panel according to claim 1, wherein the conductive adhesive foam comprises a foam strip and a conductive part; and the conductive part comprises a conductive cloth and a conductive adhesive strip, or comprises a conductive paper and a conductive adhesive strip.

4. The touch control panel according to claim 3, wherein the conductive part has a thickness which is the same as that of the polarizer.

5. The touch control panel according to claim 3, wherein a material of the conductive adhesive strip comprises a silicone rubber.

6. The touch control panel according to claim 1. wherein the high-impedance optical adhesive has an impedance of 1E+8Q to 1E+10Q.

7. The touch control panel according to claim 1, further comprising a cover plate, which is bonded with the high-impedance optical adhesive.

8. The touch control panel according to claim 1, wherein the array substrate is a low-temperature polycrystalline silicon array substrate.

9. The touch control panel according to claim 1, wherein the touch control panel comprises a full-in-cell touch control panel.

10. A display apparatus, comprising the touch control panel as claimed in claim 1.

11. A production method of a touch control panel comprising an array substrate, a color filter substrate, which is cell-aligned with the array substrate, and a polarizer located on the color filter substrate, wherein a high-impedance optical adhesive is provided above the polarizer, a ground point is provided on a surface of the array substrate towards the color filter substrate, and a conductive adhesive foam is attached on the ground point and is connected to the high-impedance optical adhesive, the method comprising steps of: attaching the conductive adhesive foam onto the ground point on the surface of the array substrate towards the color filter substrate, and attaching the conductive adhesive foam to a position to be connected to the high-impedance optical adhesive; and laminating a cover plate and a high-impedance optical adhesive, which are bonded, on the polarizer, wherein the ground point is connected to a ground terminal of the array substrate, and the ground terminal of the array substrate is connected to a ground terminal of a flexible printed circuit corresponding to the touch control panel.

12. The production method of a touch control panel according to claim 11, wherein a part of the conductive adhesive foam is attached to an area of the color filter substrate which is not covered by the polarizer; and the high-impedance optical adhesive at least partly covers the part of the conductive adhesive foam located on the area of the color filter substrate which is not covered by the polarizer.

13. The production method of a touch control panel according to claim 11, wherein the conductive adhesive foam comprises a foam strip and a conductive part; and the conductive part comprises a conductive cloth and a conductive adhesive strip, or comprises a conductive paper and a conductive adhesive strip.

14. The production method of a touch control panel according to claim 13, wherein the conductive part has a thickness which is the same as that of the polarizer.

15. The production method of a touch control panel according to claim 13, wherein a material of the conductive adhesive strip comprises a silicone rubber.

16. The production method of a touch control panel according to claim 11, wherein the high-impedance optical adhesive has an impedance of 1E+8Q to 1E+10Q.

17. The production method of a touch control panel according to claim 11, wherein the array substrate is a low-temperature polycrystalline silicon array substrate.

18. The production method of a touch control panel according to claim 11, wherein the touch control panel comprises a full-in-cell touch control panel.

* * * * *

UNITED STATES PATENT AND TRADEMARK OFFICE
CERTIFICATE OF CORRECTION

Page 1 of 1

PATENT NO. : 10,732,763 B2
APPLICATION NO. : 16/068381
DATED : August 4, 2020
INVENTOR(S) : Shicheng Sun et al.

It is certified that error appears in the above-identified patent and that said Letters Patent is hereby corrected as shown below:

On the Title Page

Item (73), Assignee Lines 2-4, delete "ORDOS EQUIPMENT MANUFACTURING BASE" and insert --ORDOS YUANSHENG OPTOELECTRONICS CO., LTD.--.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*